(No Model.) 3 Sheets—Sheet 1.
L. MAUTNER VON MARKHOF.
INSTRUMENT FOR DETERMINING THE ANGLE OF LEAD IN GUNNERY.
No. 467,256. Patented Jan. 19, 1892.
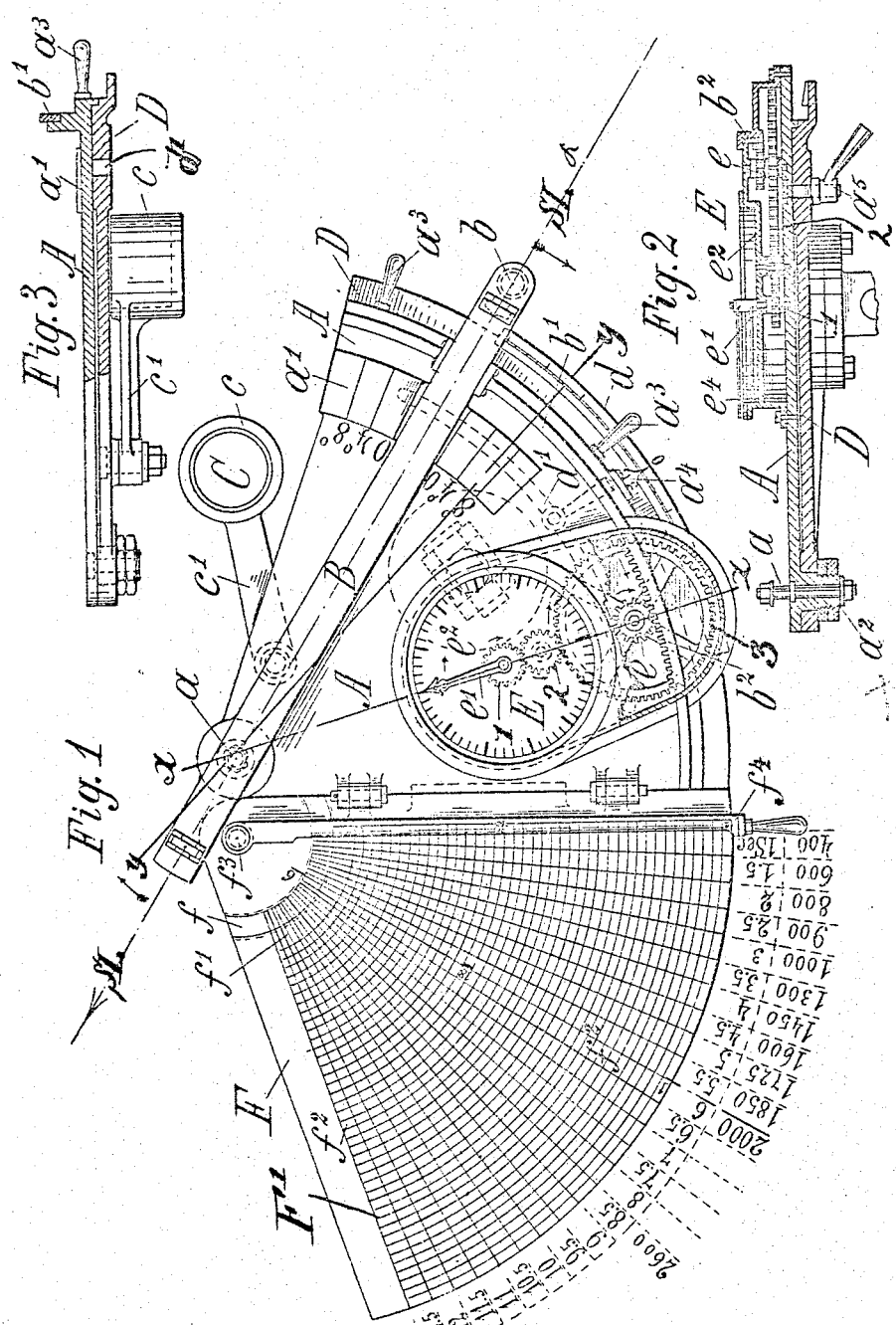
Witnesses:
H. G. Dieterich
B. W. Sommers
Inventor:
Ludwig Mautner von Markhof
by Henry Orth
Atty.

(No Model.)

3 Sheets—Sheet 2.

L. MAUTNER VON MARKHOF.
INSTRUMENT FOR DETERMINING THE ANGLE OF LEAD IN GUNNERY.

No. 467,256.    Patented Jan. 19, 1892.

Witnesses:
H. G. Dieterich
P. W. Sommers

Inventor:
Ludwig Mautner von Markhof.
by [signature] Atty (No Model.)  3 Sheets—Sheet 3.
L. MAUTNER VON MARKHOF.
INSTRUMENT FOR DETERMINING THE ANGLE OF LEAD IN GUNNERY.
No. 467,256.  Patented Jan. 19, 1892.
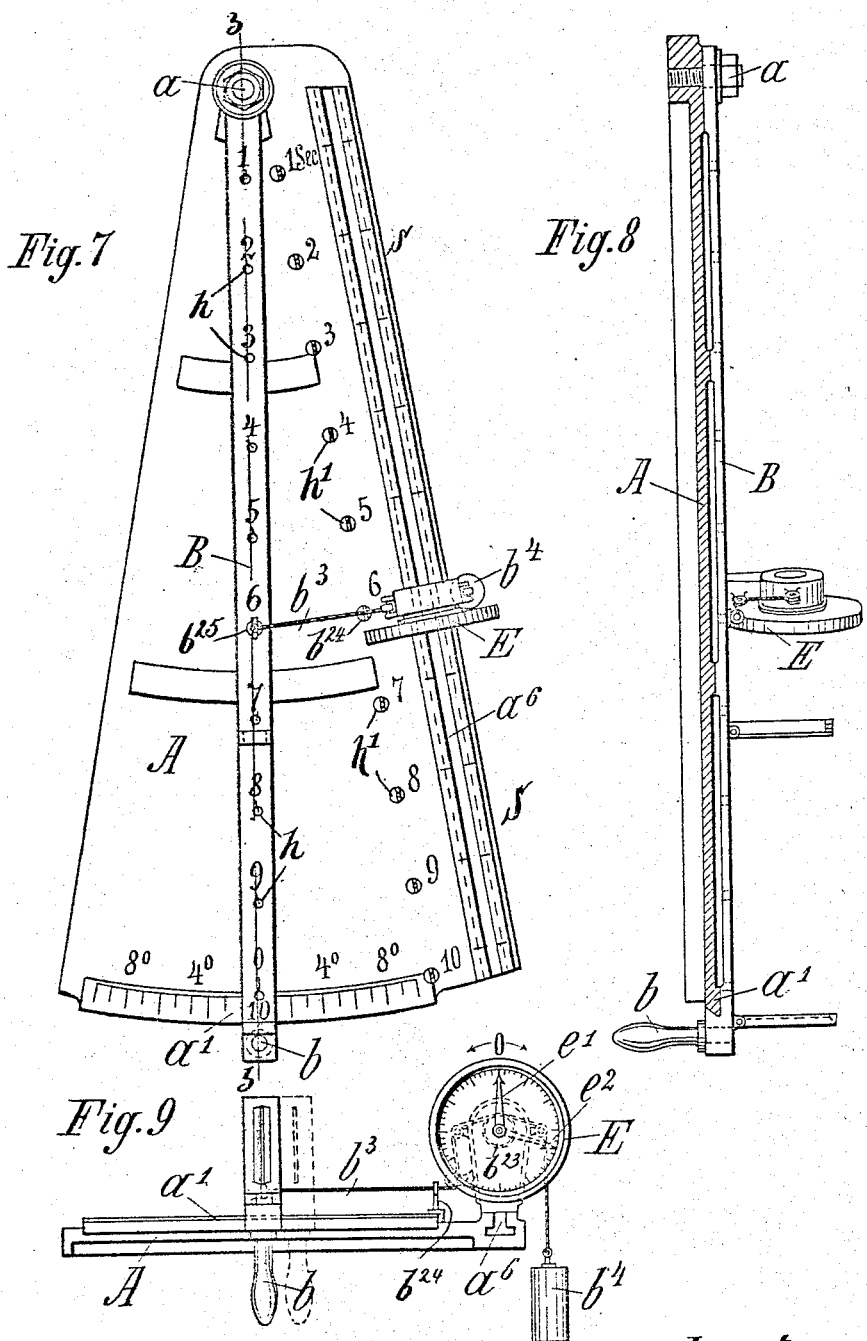
Witnesses:
H. G. Dieterich
P. W. Sommer
Inventor:
Ludwig Mautner von Markhof
by [signature]
Atty.

UNITED STATES PATENT OFFICE.

LUDWIG MAUTNER VON MARKHOF, OF VIENNA, AUSTRIA-HUNGARY.

INSTRUMENT FOR DETERMINING THE ANGLE OF LEAD IN GUNNERY.

SPECIFICATION forming part of Letters Patent No. 467,256, dated January 19, 1892.

Application filed July 10, 1891. Serial No. 399,090. (No model.)

*To all whom it may concern:*

Be it known that I, LUDWIG MAUTNER VON MARKHOF, a subject of the Emperor of Austria-Hungary, residing at Vienna, in the Province of Lower-Austria, in the Empire of Austria-Hungary, have invented certain new and useful Improvements in Processes of and Devices for the Determination of the Angle on which Guns must Deviate in Firing at Moving Aims; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It is well known that in firing from a moving gun at a fixed target or from a fixed gun at a moving target it is necessary to train the gun at such an angle relatively to the target that the latter will cross the sight-line of the gun when the projectile has traversed the distance between the gun and target, said distance bearing a fixed relation to the speed. This angle is called the "angle of lead" and has heretofore been determined by tables, the calculation being based upon the firing distance and the time of flight of a given projectile from a gun of given caliber corresponding with said distance. The latter in practice is generally determined by estimation, leaving a comparatively wide margin, especially at sea, in so far as accuracy of firing is concerned.

This invention has for its object to provide and it consists in a simple mode of and means for determining the angle of lead with greater certainty and with equally as great rapidity as by the old method and means, as will now be fully described, reference being had to the accompanying drawings, in which like symbols indicate like parts wherever such may occur in the several figures, and in which drawings—

Figure 5:
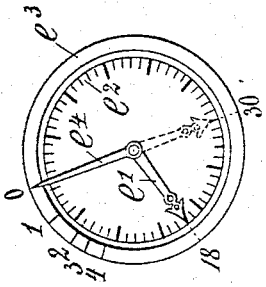
Figure 4:
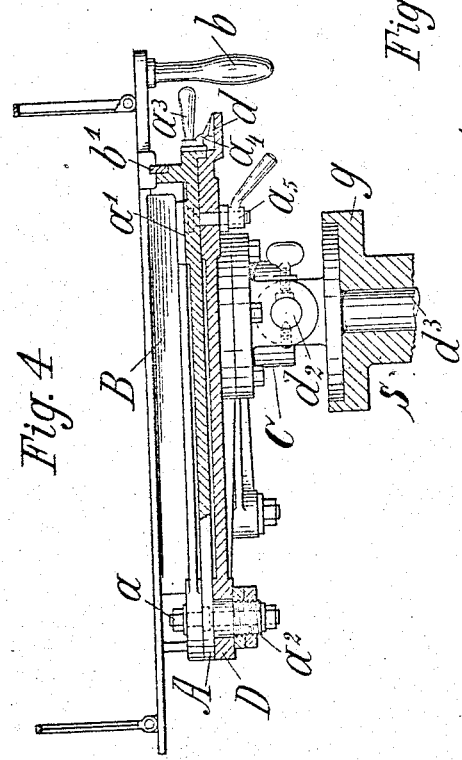
Figure 6:
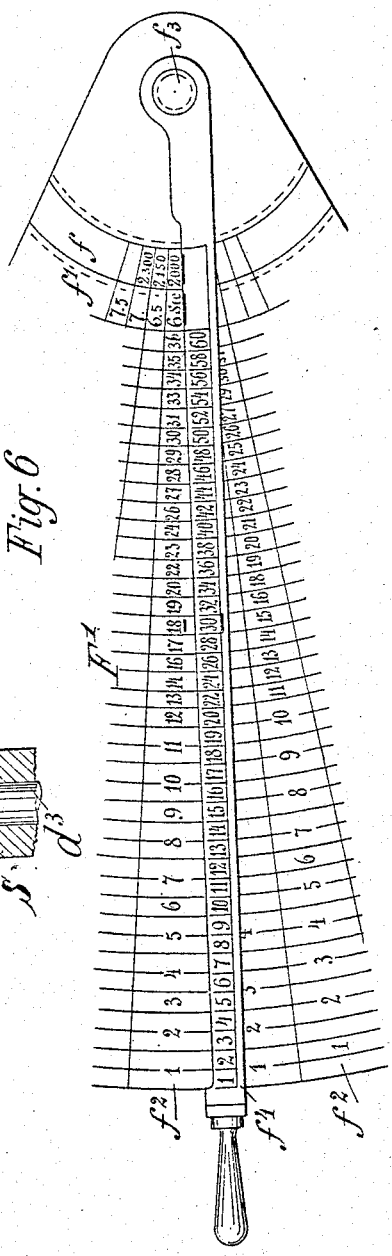

Figure 1 is a top plan view of my improved instrument provided with a table giving the angle of lead proportionate to the firing distance and the time of flight of the projectile, a portion of the angle-indicator casing being broken away to show a part of the transmitting-gear. Fig. 2 is a section of the instrument, taken on line $x\,x$ of Fig. 1, the alidade of the angulometer being removed, the lower portion of the bearings for the instrument broken away, and a portion of the angle-indicator gearing shown in elevation. Fig. 3 is a like view taken about on line $y\,y$ of Fig. 2 and looking toward the right of the instrument. Fig. 4 is a view similar to Fig. 2, the section being taken on a line parallel with the alidade on the left-hand side thereof and showing the bearings for the instrument. Fig. 5 is a face view of the angle-indicator. Fig. 6 is a top plan view, drawn to an enlarged scale, of a portion of the table of reduced angles. Fig. 7 is a top plan view of a modified construction in which the table of reduced angles is dispensed with, said angles being mechanically reproduced and indicated by the angle-indicator. Fig. 8 is a section taken on line 3 3 of Fig. 7, the alidade of the angulometer being shown in elevation; and Fig. 9 is a front elevation of the instrument shown in Figs. 7 and 8.

The method of determining the angle of lead consists in reducing the angle produced by the motion of the alidade of the angulometer directed upon a target for a given period of time to the angle corresponding to the time of flight of the projectile, the gun or target being in motion, the firing distance not being a factor in this operation, except in so far as the time of flight of the projectile is concerned.

The apparatus consists, essentially, of an angulometer composed of an alidade and a suitably-graduated scale and of an indicator adapted to reproduce these angles in such a manner that they may be more readily read off. With these devices may be combined a table and a finder by means of which the angle of displacement or of lead corresponding to the time of flight of the projectile and to the angle obtained by the angulometer when the alidade is made to follow the target for a given period of time may be readily obtained, or these angles of lead may be mechanically reproduced by the angle-indicator.

In order to avoid confusion and for the sake of clearness, I will describe the invention in its use with a stationary or substantially stationary gun and a moving target.

The angles obtained with the angulometer will hereinafter be called the "angle or angles of displacement," and the tables giving the angles of displacement reduced to the time of flight of the projectile—that is to say, the angles of lead—will hereinafter be called the "reduction-table" for the sake of abbreviation.

Referring now to Figs. 1 to 6, inclusive, D indicates a sector-shaped table adjustable about a horizontal axis $d^2$ and about a vertical axis $d^3$ on a suitable support S, so that said table may be adjusted as circumstances may demand, and is provided with a scale $d$ at its outer curved edge. This table D serves as a support for the angulometer, which consists of a sector-shaped board A, provided with a suitable angle-scale $a'$, and of an alidade B, mounted upon the pivot $a$, on which both the board and the alidade are free to revolve, said pivot being at the center of the two sectors D A. The board A is also provided with a pointer $a^4$, projecting over the scale $d$ on table D, and with two handles $a^3$ $a^3$. The alidade B is provided with a handle $b$ for obvious purposes. The object of pivotally connecting the scale-board A of the angulometer with its support is to provide a means for properly applying the instrument to a gun without shifting the sight from its zero graduation, the displacement of the board being indicated by the pointer $a^4$ of board A on scale $d$ of table D. The alidade B carries a segmental toothed rack $b'$, that actuates the mechanism of the angle-indicator E, the object of which is to reproduce in a more readily visible manner and on an enlarged scale the angles obtained with the angulometer, which consists of a dial divided into sixty equal parts, a hand $e'$, revoluble on said dial, and transmitting-gearing consisting of the pinion 1 on arbor of hand $e'$, the pinion 2 in gear with pinion 1 and with a transmitting-wheel 3, and a pinion $b^4$ on arbor of wheel 3, in gear with the toothed rack $b'$ of the alidade B. In order that the time of aim may be more readily noted, I provide a time-piece C, indicating or striking seconds, contained in a suitable case $c$, secured to an arm $c'$, that is pivoted to the under side of the table D at the right-hand side, so that it may be brought into proximity to the operator or swung out of the way under the table when not in use, said table then serving as a cover for the time-piece. At the left-hand side of the table D is arranged the sector-shaped board F, that is provided with the reduction-table F', and, as shown in Fig. 1, the board F is preferably hinged to board A, so as to swing over the latter and serve as a cover for the angulometer and the angle-indicator. The reduction-table F' has a series of concentric rows of indices forming columns radiating from the center $f^3$ of the sector, to which is pivoted the finder $f^4$. The inner row $f$ of the series of concentric rows,—that is to say, the row nearest to the center of the sector—has inscribed thereon various firing distances and the row $f'$ next adjacent thereto the time of flight of a projectile corresponding with these firing distances. Inasmuch as the time of flight varies with the caliber of the gun and the nature of the projectile, I preferably arrange the firing distance and corresponding time-of-flight indices on separate segments of circles, the indices thereon varying with the caliber of the gun and the nature of the projectile, and detachably secure the same to the board F, so that they may be interchangeably used with the reduction-table F'. The number of subdivisions in each radial column $f^2$ of the table F' is proportionate to the subdivisions on the dial of the angle-indicator, and these rows are numbered consecutively, commencing with 1 at the outer subdivisions of each row. The finder $f^4$ consists of a rule provided with graduations corresponding with those on the dial of the angle-indicator, and, as above stated, is pivoted to the center $f^3$ of the sector-board F and provided with a handle for manipulating the same. In Fig. 1 I have shown the firing distance and time-of-flight indices arranged on the outside of the table F' for the sake of clearness. It is obvious that the reduction-table may have its columns arranged in parallel rows, the finder being then arranged to move in a straight line parallel with the rows; but I prefer the arrangement shown and described as being the most convenient.

In order that a plurality of guns lying in different planes relatively to the alidade of the angulometer may be trained to the proper angle of lead, I provide the indicator-dial $e^2$ with an additional hand $e^4$, Fig. 5, that is adjustable on the arbor of the hand $e'$, and with an additional graduated scale $e^3$, the graduations 1 2 3 4, &c., corresponding to the positions in which the alidade B of the angulometer lies parallel with the sight-line of the several guns.

The operation of the instrument constructed as described is as follows, the parts being in their relative positions shown in Fig. 1, the longitudinal axis of the gun being supposed to be in parallelism with the alidade and the target to be moving from left to right: The alidade is trained upon the moving target and caused to follow its movements for a given period of time—say, for instance, ten seconds—noted from the time-piece C, the movement of the alidade in this case from right to left over the scale of angles $a'$ being transmitted to the hand $e'$ through the medium of the toothed rack $b'$ and the described transmitting-gearing, and thereby enlarged and rendered more readily visible. At the expiration of the ten seconds the angle of displacement indicated by the indicator E is noted and reduced to the angle corresponding with the time of flight of the projectile. If the indicator-hand has moved from "0" to "30" on the scale of the dial $e^2$, as shown in dotted lines in Fig. 5, and if the estimated firing distance is two thousand meters and the time of flight of a given projectile from a gun of given caliber is six seconds the finder $f^4$ is moved over the reduction-table F' to the column having the same distance and time-of-flight indices, and the angle inscribed in the subdivision corresponding with the "30" graduation on the finder (in this case eighteen degrees) will be the angle of lead. The alidade is now turned back to the opposite side of the zero graduation on its scale until the indicator-hand $e'$ points to the "18" graduation, when the alidade will be in the correct angle of lead. The support for the gun and alidade—i. e., the ship—is now swung round until the target again crosses the sight-line, at which moment the gun will lie in the proper angle of lead and is fired. If this angle of lead is to be given to several guns, the position of which differs from that of the zero position of the alidade, and which position is indicated on the auxiliary scale $e^3$ of the indicator-dial $e^2$, the alidade is first moved until the hand $e'$ points to the angle-of-lead graduation—say eighteen degrees, as in the above case. Then the auxiliary hand $e^4$ is placed at the zero graduation of said auxiliary scale and secured in that position. The angle of lead for each of the several guns is then obtained by moving the alidade B until the auxiliary hand $e^4$ points to the position 1, 2, 3, or 4, &c., of the particular gun to be fired, the firing taking place the moment the target crosses the sight-line of the alidade. In practice the explosion of the charge will be effected by means of an electric current.

The instrument shown in Figs. 7, 8, and 9 does not differ materially from that shown and described in reference to Figs. 1 to 6, the difference being in the means provided whereby the indicator E will give the angles reduced to those corresponding with the time of flight of a projectile, so that the table F' and its finder can be dispensed with, the operation of determining the angle of lead being made more easy and more rapid and the instrument rendered more compact. To these ends the sector-board A has along its right-hand edge a groove $a^6$—that is to say, the groove $a^6$ extends along a radial line of the sector-board, which is parallel with the alidade when said alidade is in a given position on its scale $a'$—that is to say, when it is on the angle indication 10 on the right hand of the zero indication. In this groove $a^6$ the angle-indicator E, provided with a suitable support fitting said groove, is free to slide, a scale S, graduated to seconds, being provided on each side of the groove. In the example shown this scale has ten graduations corresponding with an observation or aim of the alidade of ten seconds, said graduations commencing with 1 from a point in an arc of a circle described by the alidade B near its center of rotation, and from thence outwardly, the alidade B being provided with corresponding graduations indicated by holes $h$ formed therein. The transmitting mechanism of the indicator is here connected with the alidade by means of a flexible connection, and in order that said connection may be kept in a straight line as near as possible I secure to the table A a series of pins $h'$, that have hooks $b^{24}$ on a line parallel with and adjacent to the scale S, said holes $h'$ lying in arcs of circles intersecting the holes $h$ in the alidade and the graduations on the scale S. The cord $b^3$, that connects the transmitting mechanism of the angle-indicator E with the alidade B, has at one end a peg $b^{25}$ attached thereto, the pin $h'$, provided with an eye or hook $b^{24}$, before referred to, being employed to maintain the cord in a line substantially at right angles to the alidade in table A, according to the adjustment of the indicator E relatively to the alidade B. The cord is wound around a drum $b^{23}$ (shown in dotted lines in Fig. 9) and has a weight $b^4$ attached to its free end. The diameter of the drum is so chosen that when the alidade describes an angle of one degree the indicator-hand $e'$ will describe an angle of ninety degrees when both the alidade and the indicator are set to the ten-seconds graduation.

The operation of the instrument as described in reference to Figs. 7, 8, and 9 is as follows, it being assumed here, also, that the firing distance is two thousand meters and the time of flight of the projectile six seconds: The indicator is moved to and connected with the alidade at the six-seconds graduation. The said alidade is then aimed at the moving target for a period of ten seconds, at the expiration of which the indicator-hand $e'$ will indicate the angle of displacement described by the alidade reduced to the angle corresponding with the time of flight of the projectile or the angle of lead. The angle-indicator is now adjusted to the ten-seconds graduation and connected with the alidade at the same graduation, the said alidade being now moved in a reverse direction until the hand $e'$ again points at the angle graduation previously pointed at, but on the opposite side of its zero position, when the gun may be trained to the proper angle of lead. Since the radii corresponding with the graduations on the alidade are proportionate to the angles of displacement described thereby, it follows that when the indicator-hand is placed at zero and the indicator adjusted to the time of flight of the projectile and correspondingly connected with the alidade the angle described by the latter during an observation of ten seconds will be equal to an angle of displacement corresponding with the time of flight, and this angle will be indicated by the indicator-hand. In order that the alidade, and consequently the gun, may again be brought to bear upon the target, which has moved out of the line of sight during the adjustment to the angle of lead by either of the means described, it is necessary to impart to the instrument as well as to the gun-support (the ship, for instance) a swinging motion, the gun being fired the moment the target again crosses the sight-line, and, as hereinbefore stated, this is preferably effected by the closure of an electric circuit.

Although I have described the operation of the instruments in their application to a moving target, it is obvious that the same results are obtained when the target is stationary and the gun is in motion.

Having thus described my invention, what I claim as new therein, and desire to secure by Letters Patent, is—

1. In gunnery, the mode of determining the angle of lead in firing from a gun in motion or upon a moving target, which consists in sighting the target for a given period of time and reducing the angle described by the sight to an angle corresponding with the time of flight of the projectile, for the purpose set forth.

2. In gunnery, the mode of training guns in firing from a gun in motion or upon a moving target, which consists in first determining the elevation of the gun by bringing the same in parallelism with a sighting device, sighting the target for a given period of time, reducing the angle described by the sight to an angle corresponding with that of the time of flight, adjusting the sight to said angle in a direction opposite to the motion of the target or gun, and swinging the supports for the sight and gun until the target again intersects the line of sight, as set forth.

3. An instrument for determining the angle of lead in firing from a gun in motion or upon a moving target, comprising a support composed of two sections adapted to fold onto each other, and an angulometer mounted upon one of the sections, whereby the other section serves as a cover for the angulometer when folded over the same.

4. An instrument of the class described, comprising a support composed of two sections adapted to fold onto each other, a reduction-table on one of said sections, and an angulometer on the other section, whereby when the sections are folded together they form an inclosure for the said devices.

5. An instrument of the class described, comprising a support composed of two sections adapted to fold onto each other, an angulometer mounted on one of said sections, a reduction-table, and a finder having motion over said table on the other section, whereby when said sections are folded they form an inclosure for the said devices.

6. An instrument of the class described, comprising a support composed of two sections adapted to fold onto each other, and an angulometer mounted on and a time-piece indicating seconds pivoted and adapted to swing under one of said sections, whereby said support-sections form covers for the said devices.

7. An instrument of the class described, comprising a support composed of two sections adapted to fold onto each other, an angulometer, and an angle-indicator operated by the angulometer mounted on one of said sections, whereby when said sections are folded they form an inclosure for the said devices.

8. In an instrument for determining the angle of lead in firing from a gun in motion or upon a moving target, the combination, with an angulometer consisting of an alidade and a scale of angles over which said alidade is adapted to move, of an angle-indicator and actuating devices therefor operated by the alidade.

9. In an instrument for determining the angle of lead in firing from a gun in motion or upon a moving target, the combination, with an angulometer consisting of an alidade and a scale of angles over which said alidade is adapted to move, of an angle-indicator adapted to be operated by the alidade so as to reproduce the angles described thereby reduced to angles corresponding with the time of flight of the projectile.

10. In an instrument for determining the angle of lead in firing from a gun in motion or upon a moving target, the combination, with an angulometer composed of an alidade and a scale of angles over which the alidade is adapted to move, of an angle-indicator and multiplying actuating devices operated by the alidade so as to reproduce the angles described thereby on a larger scale, for the purpose set forth.

11. In an instrument for determining the angle of lead in firing from a gun in motion or upon a moving target, the combination, with an angulometer consisting of a scale graduated to angles and an alidade revoluble on a fixed pivot and projecting over said scale, said alidade being provided with a scale graduated to seconds, of an indicator adjustable on a scale graduated to seconds and parallel with the alidade when the latter occupies a given position on the angle-scale, and actuating devices for actuating the indicator, adapted to be connected with the alidade at the different points of its seconds-scale and set in motion thereby, for the purpose set forth.

12. In an instrument for determining the angle of lead in firing from a gun in motion or upon a moving target, the combination, with an angulometer consisting of a board A, having the shape of a sector and provided with a radial groove, a scale graduated to seconds arranged adjacent to said groove, a scale of angles arranged on an arc of a circle concentric with the outer edge of the sector, and an alidade pivoted at the center of the sector and having motion over said scale, said alidade being also provided with a scale graduated to seconds corresponding with the scale adjacent to the groove, of an indicator adapted to be adjusted in the groove of the board and multiplying actuating devices for actuating the indicator and reproducing the angles described thereby on a larger scale, said actuating devices being adapted to be connected with the alidade at different points of its seconds-scale, for the purpose set forth.

13. In an instrument for determining the angle of lead in firing from a gun in motion or upon a moving target, the combination, with an angulometer consisting of a board A, having the shape of a sector and provided with a radial groove, a scale graduated to seconds arranged adjacent to said groove, a scale of angles arranged on an arc of a circle concentric with the outer edge of the sector, and an alidade pivoted at the center of the sector and having motion over said scale, said alidade being also provided with a scale graduated to seconds corresponding with the scale adjacent to the groove, of an indicator adapted to be adjusted in the groove of the board, and actuating devices for actuating the indicator, adapted to be connected with the alidade at different points of its seconds-scale, for the purpose set forth.

14. The combination, with the alidade B, of an indicator comprising a graduated dial, a graduated scale encompassing the dial, and two hands on the same arbor adapted to revolve about the dial and scale, the hand revolving about said scale being adjustable on the arbor, in combination with actuating devices for actuating the hands, said devices being set in motion by the alidade, for the purpose set forth.

In testimony whereof I affix my signature in presence of two witnesses.

LUDWIG MAUTNER VON MARKHOF.

Witnesses:
W. B. MURPHY,
JULIUS GOLDSCHMIDT.